United States Patent
Webb

(10) Patent No.: US 7,620,911 B2
(45) Date of Patent: Nov. 17, 2009

(54) COLLAPSIBLE DIALOG WINDOW

(75) Inventor: Mark Stephen Webb, Manchester, NH (US)

(73) Assignee: Autodesk, Inc., San Rafael, CA (US)

( * ) Notice: Subject to any disclaimer, the term of this patent is extended or adjusted under 35 U.S.C. 154(b) by 1414 days.

(21) Appl. No.: 09/905,298

(22) Filed: Jul. 12, 2001

(65) Prior Publication Data

US 2003/0011639 A1   Jan. 16, 2003

(51) Int. Cl.
*G06F 3/048* (2006.01)
(52) U.S. Cl. .................. 715/809; 715/795; 715/796; 715/802; 715/859
(58) Field of Classification Search ......... 345/766–767, 345/795, 796, 800–802, 809, 815, 862, 788; 715/781, 782, 789, 790, 791, 794, 797, 798, 715/793, 859
See application file for complete search history.

(56) References Cited

U.S. PATENT DOCUMENTS

| | | | | |
|---|---|---|---|---|
| 5,680,562 | A * | 10/1997 | Conrad et al. | 345/797 |
| 5,784,058 | A * | 7/1998 | LaStrange et al. | 715/738 |
| 5,874,958 | A | 2/1999 | Ludolph | |
| 6,039,047 | A * | 3/2000 | Rock et al. | 128/897 |
| 6,184,883 | B1 * | 2/2001 | Bates et al. | 715/794 |
| 6,232,971 | B1 * | 5/2001 | Haynes | 345/800 |
| 6,335,743 | B1 * | 1/2002 | Owings | 345/801 |
| 6,335,745 | B1 * | 1/2002 | Amro et al. | 345/835 |
| 6,512,529 | B1 * | 1/2003 | Janssen et al. | 715/790 |
| 6,853,390 | B1 * | 2/2005 | Wandersleben et al. | 715/802 |

OTHER PUBLICATIONS

Microsoft(R) Word 2000, (c)1999, screenshots 1-3.*
Gnome User Interface Guidelines, Chapter 6. User Interface components, pp. 1-3, 2001.
http://java.sun.com/products/jlf/ed2/book/HIG.Dialogs.html, Guidelines Home Page—Java Look and Feel Design Guidelines, 2nd Edition: Part III: The Components of the Java Foundation Classes 8:Dialog Boxes and Alert Boxes, Sun Microsystems, Inc. pp. 1-3, 2001.
http://java.sun.com/products/jlf/ed2/book/HIG.Glossary.html, Guidelines Home Page—Java Look and Feel Design Guidelines, 2nd Edition: Part IV: Backmatter: Glossary, Sun Microsystems, Inc. pp. 1-15, 2001.

* cited by examiner

*Primary Examiner*—Kieu Vu
*Assistant Examiner*—Blaine T. Basom
(74) *Attorney, Agent, or Firm*—Gates & Cooper LLP

(57) ABSTRACT

A method, apparatus, and article of manufacture of the invention provide for collapsing a dialog window of an application. A complete dialog window of a currently active application is displayed on a display device. A location of a cursor with respect to the dialog window is determined. A collapsed version of the dialog window is displayed when the cursor moves outside of the complete dialog window, wherein the collapsed version of the dialog window consumes a smaller area of the display device than the complete dialog window. A complete version of the dialog window is displayed when the cursor moves within the collapsed version of the dialog window.

27 Claims, 5 Drawing Sheets

COLLAPSIBLE DIALOG WINDOW

BACKGROUND OF THE INVENTION

1. Field of the Invention.

The present invention relates generally to graphical user interfaces, and in particular, to a method, apparatus, and article of manufacture for collapsing dialogs and/or windows of a graphical user interface of an application.

2. Description of the Related Art.

Computer systems and computer applications commonly present and display information in a visually appealing and organized manner on a display device through a graphical user interface. Such graphical user interfaces typically display the information in one or more "windows". Further, each active application (or document) executing on the computer system is often represented by a different window. In addition to a main or primary window for each active application, additional secondary windows may also be displayed by each application. Such secondary windows may provide the user with a plethora of information and capabilities (e.g., warning messages, the progress of a task, the ability to adjust application specific settings, etc.).

A dialog box/window is a secondary window that allows the user to interact with an application in ways that supplement the task in the main/primary window. For example, dialog boxes may be used to control the properties of an object, to request further information from the user or to notify the user of an event. Specific examples include a dialog box that enables users to set preferences or choose a file from the hard disk. A dialog box can contain panes and panels, text, graphics, controls (such as checkboxes, radio buttons, or sliders), and/or one or more command buttons. Dialog boxes may be implemented in a variety of different forms, suitable for different situations, and each with their own user interface implications.

All dialog boxes are classified as either modal or modeless. A modal dialog box prevents users from interacting with any other part of the application until the dialog box is dismissed. However, users can move a modal dialog box and interact with other applications while the modal dialog box is open. This behavior is sometimes referred to as "application-modal". Modal dialog boxes are often only used where it is necessary that the user doesn't make any changes to the state of the program before performing an action with the dialog or closing it.

A modeless dialog box does not prevent users from interacting with the application they are in or with any other application while the dialog is visible. Users can go back and forth between a modeless dialog box and other application windows. Generally, modeless dialog boxes are used for tasks such as changing the properties of an object or tool.

An alert or informational dialog box is a secondary window that does not require the user to enter any data or make choices (although they may require brief interaction with users). Accordingly, alert/informational dialog boxes are often used merely for notification purposes. For example, such boxes may present error messages, warn of potentially harmful actions, obtain a small amount of information from users, or display messages. The basic alert/informational box has a symbol that identifies the type of the alert, a textual message, and one or more command buttons (e.g., to close the box). Alert/informational dialog boxes may be either modal or modeless as appropriate.

The layout of a dialog box often does not change substantially between applications. FIG. 1 illustrates a typical dialog box of the prior art. The top portion of a dialog box often contains a title bar 102 that includes a representative icon 104 and title 106 for the dialog box on the left side and one or more icons 108-112 on the right side of the title bar for various system operations. Such system operation icons may include a "–" 108 for minimizing the application, an icon 110 for maximizing or restoring the dialog box, and/or an "X" 112 for closing the dialog box.

A dialog box may also include text or a message (e.g., an alert warning or error message) to the user 114. Further, as described above, various mechanisms 116-122 may be presented in a dialog box which allow a user to provide input or interact with the dialog box. Such mechanisms may include a drop down menu 116, text fields 118, radio buttons 120, and/or an action button 122 (e.g., "CLOSE", "CANCEL", "OK", etc.).

Many applications use one or more variations of the above-described dialog boxes. Further, it is often desirable to open a dialog box and for the dialog box to remain open while a user is working in the main application. However, as each dialog box is opened, screen space is consumed by the dialog box and taken away from the underlying active application. Accordingly, with multiple dialog boxes open, valuable screen space is unavailable to the user. Such screen space is paramount in many applications including drawing applications where modeless dialogs allow drawing to continue but can cover significant areas of the drawing space. Further, displayed dialog boxes tend to distract the user's attention from the main application and task being performed.

To reduce the size of a dialog box, limited options are available. Further, all of the available options require multiple actions by the user. For example, a user can close the dialog box (e.g., using close button 122 or by selecting icon "X" 112). Alternatively, the user can minimize the dialog box (e.g., by selecting icon "–" 108). In another alternative, the user may restore down the dialog box (e.g., by selecting icon 110). Once any of these options are selected, the user must then click in the main application window to work in the main application. Thus, the user must not only specifically select or take action to minimize the space consumed by the dialog box, but the user must also make an additional selection to continue working in another application.

Additionally, if the user then desires to view the contents of the dialog box or perform further actions in the dialog box, the user must select the appropriate icon or take additional action to reopen the dialog box.

What is needed is a method for conserving screen space while using one or more dialog boxes of an application program. Further, what is needed is a method that minimizes the amount of user actions required.

SUMMARY OF THE INVENTION

A dialog window is configured to collapse to an area that consumes less workspace of an application. When a cursor moves away from a dialog window, the dialog window is minimized to a small area (e.g., the title bar) thereby freeing up workspace for an underlying application. To display the dialog window again, the cursor is merely moved over the minimized window. When minimized, the focus of the application may revert to the underlying application window such that no further user action is necessary to continue working with the underlying application. Additionally, the collapsing/expanding of the dialog window may be delayed once the cursor is moved outside of the dialog window to prevent rapid expansion/collapsing when the cursor hovers near the dialog edge. Further, the dialog window may collapse to the top right so that the system buttons do not move locations (i.e., away from the cursor).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A dialog window is configured to collapse to an area that consumes less workspace of an application. When a cursor moves away from a dialog window, the dialog window is minimized to a small area (e.g., the title bar) thereby freeing up workspace for an underlying application. To display the dialog window again, the cursor is merely moved over the minimized window.

Hardware and Software Environment

Figure 1:
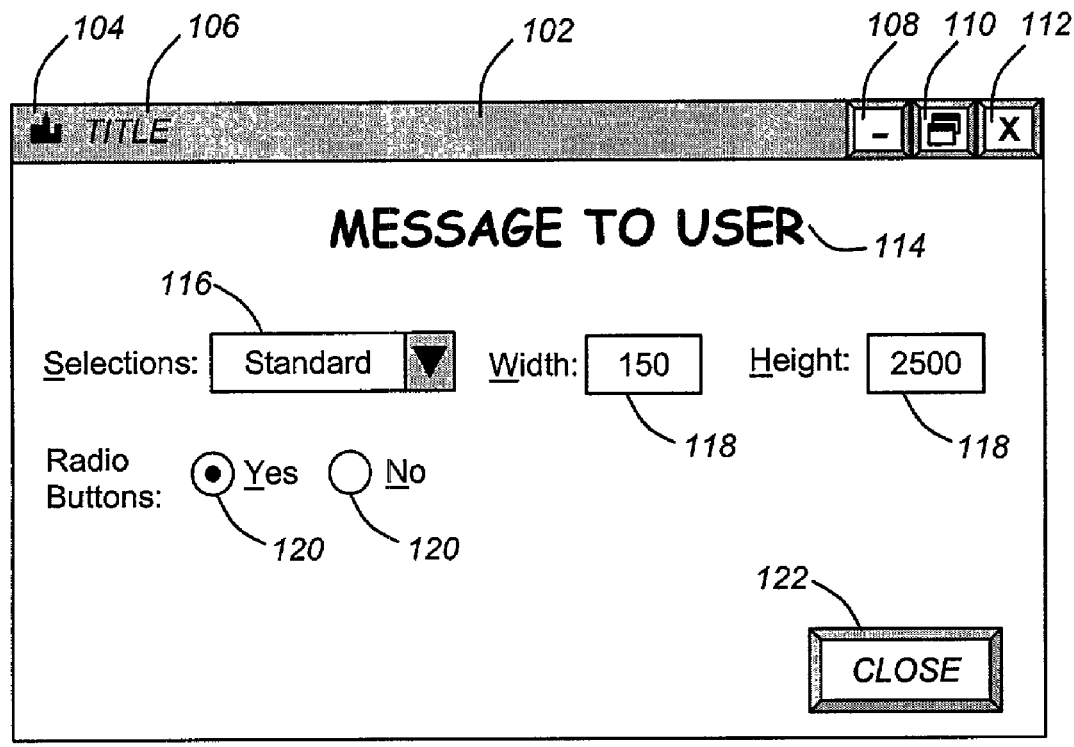
FIG. 1 illustrates a typical dialog box of the prior art.
Figure 2:
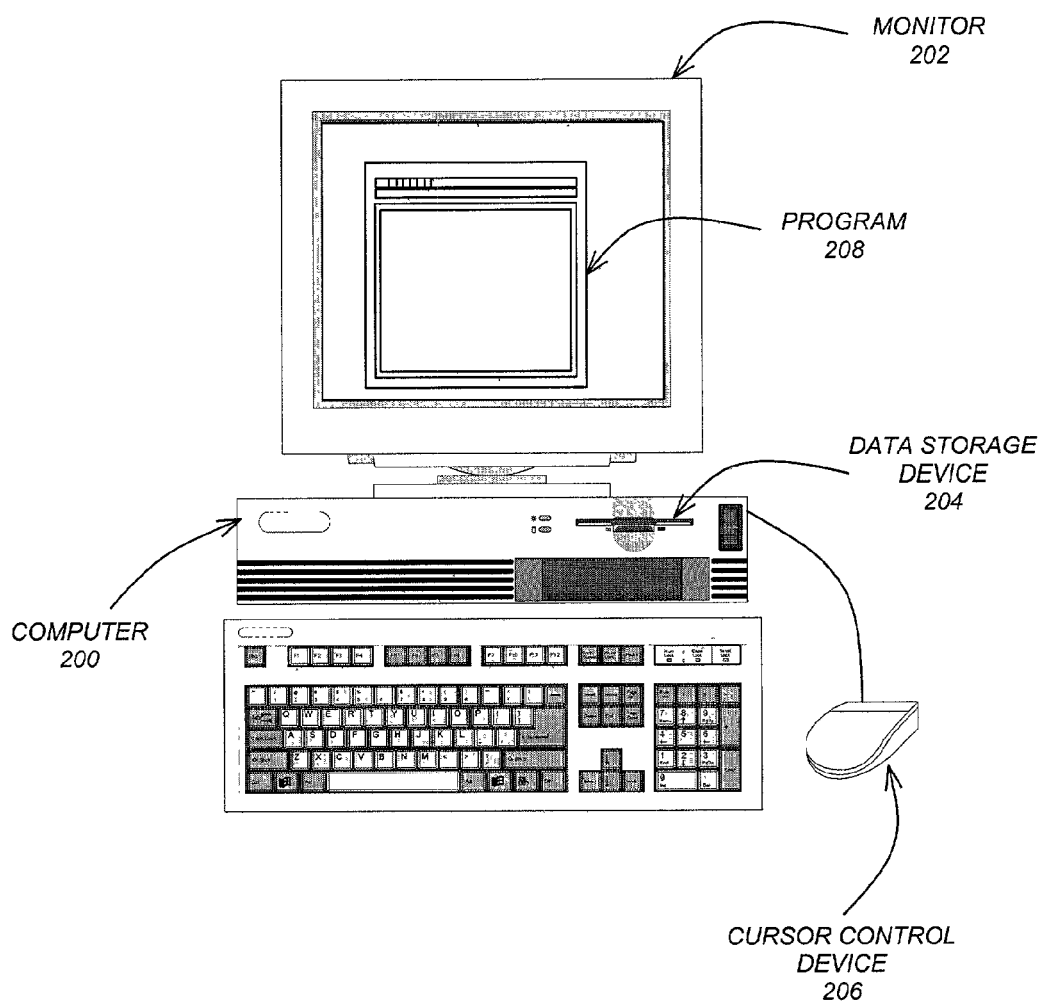
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a monitor 202, data storage devices 204, cursor control devices 206, and other devices. Those skilled in the art will recognize that any combination of the above components, or any number of different components, peripherals, and other devices, may be used with the computer 200.

The preferred embodiment of the present invention is implemented by a computer-implemented program 208, wherein a window displayed on the monitor 202 represents the program 208. Generally, the program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Software Embodiments

Figure 3:
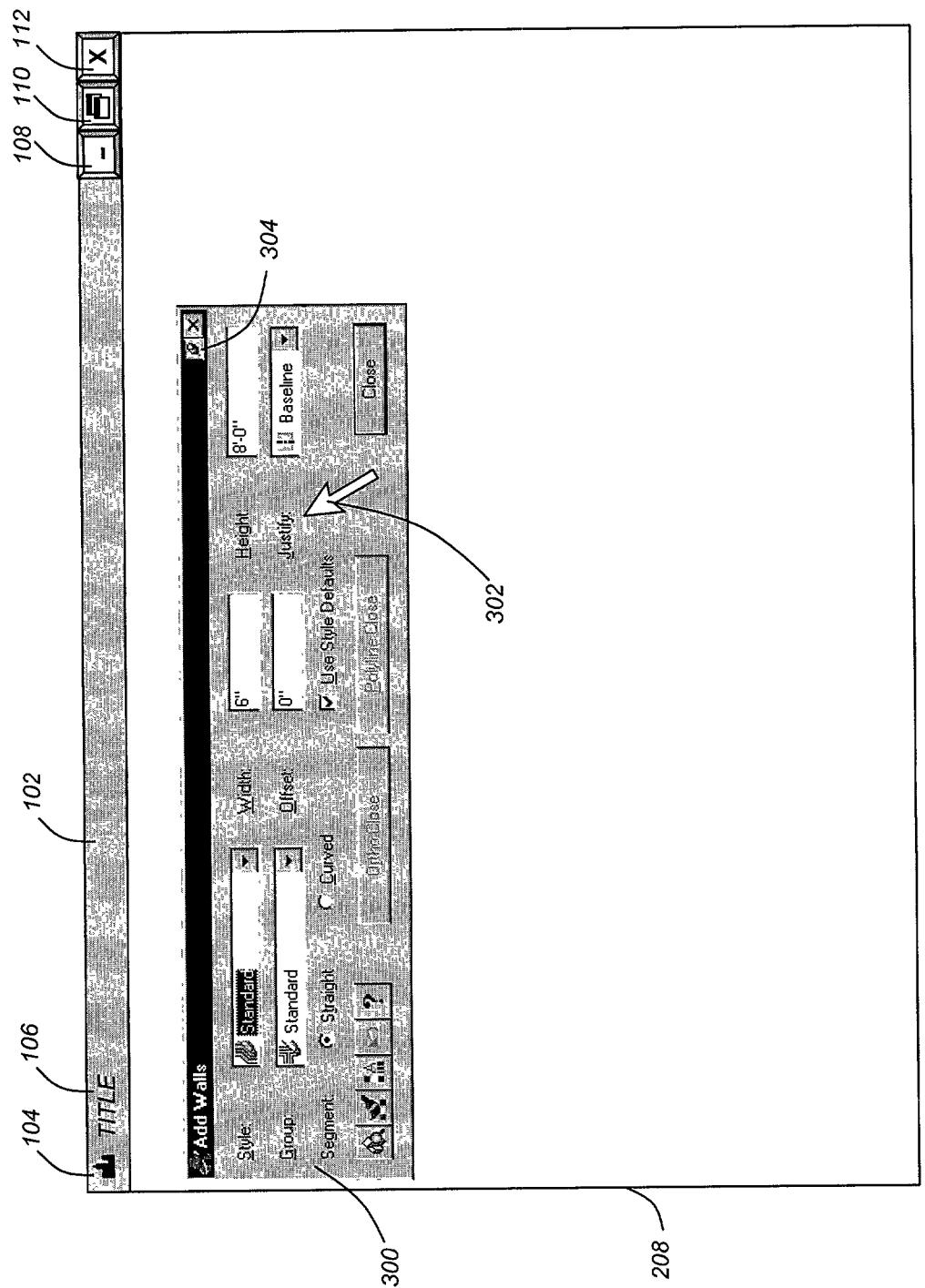
FIG. 3 illustrates a desktop window having a collapsible dialog window in accordance with one or more embodiments of the invention.

In one or more embodiments of the invention, a dialog window (e.g., a modeless or modal dialog window) displayed on monitor 202 hides/collapses based on the location of a cursor controlled by cursor control device 206. FIG. 3 illustrates a desktop window having a collapsible dialog window. As illustrated, application window 208 is displayed on monitor 202. A dialog window 300 allows the user to interact and provide information supplemental to the primary task of application 208 (e.g., drafting a computer-aided design (CAD) drawing). Such information may include a drop-menu selection of a style setting, group setting and justification, the text entry of a width, height, and offset, a radio button selection of a segment type (e.g., straight or curved), a checkbox entry for using style defaults, other additional icons for setting additional features, etc.

As displayed in FIG. 3, the dialog window 300 is a complete dialog window of active application 208. The dialog window 300 remains a complete version of the window as long as cursor 302 remains within the window 300. Once the cursor 302 is moved outside of window 300, the dialog window 300 may collapse into a smaller version.

The ability for the dialog window 300 to collapse in this manner may be controlled by a selectable system icon 304 (also referred to as a pushpin icon) which may be displayed in a title bar of the dialog window 300. If pushpin icon 304 is depressed, the collapsing ability (also referred to as a pushpin feature) is activated thereby allowing the dialog window 300 to collapse. However, if pushpin icon 304 is not selected (or deactivated), the complete version of the dialog window 300 remains open and visible on the screen (i.e., until closed). Thus, when deactivated, the behavior of dialog window 300 is no different from that of a normal dialog window 300 (i.e., the size remains the same). Pushpin 304 may be activated or deactivated similar to a button that may be clicked/selected using a cursor control device 206.

Alternatively, instead of using a pushpin icon 304, a menu choice or option may be selected. Such an option may be set through a menu displayed using a right click on the dialog window 300, or may be a setting from within application 208 (e.g., accessible through the "Tools" menu option or other locations within application 208).

Figure 4:
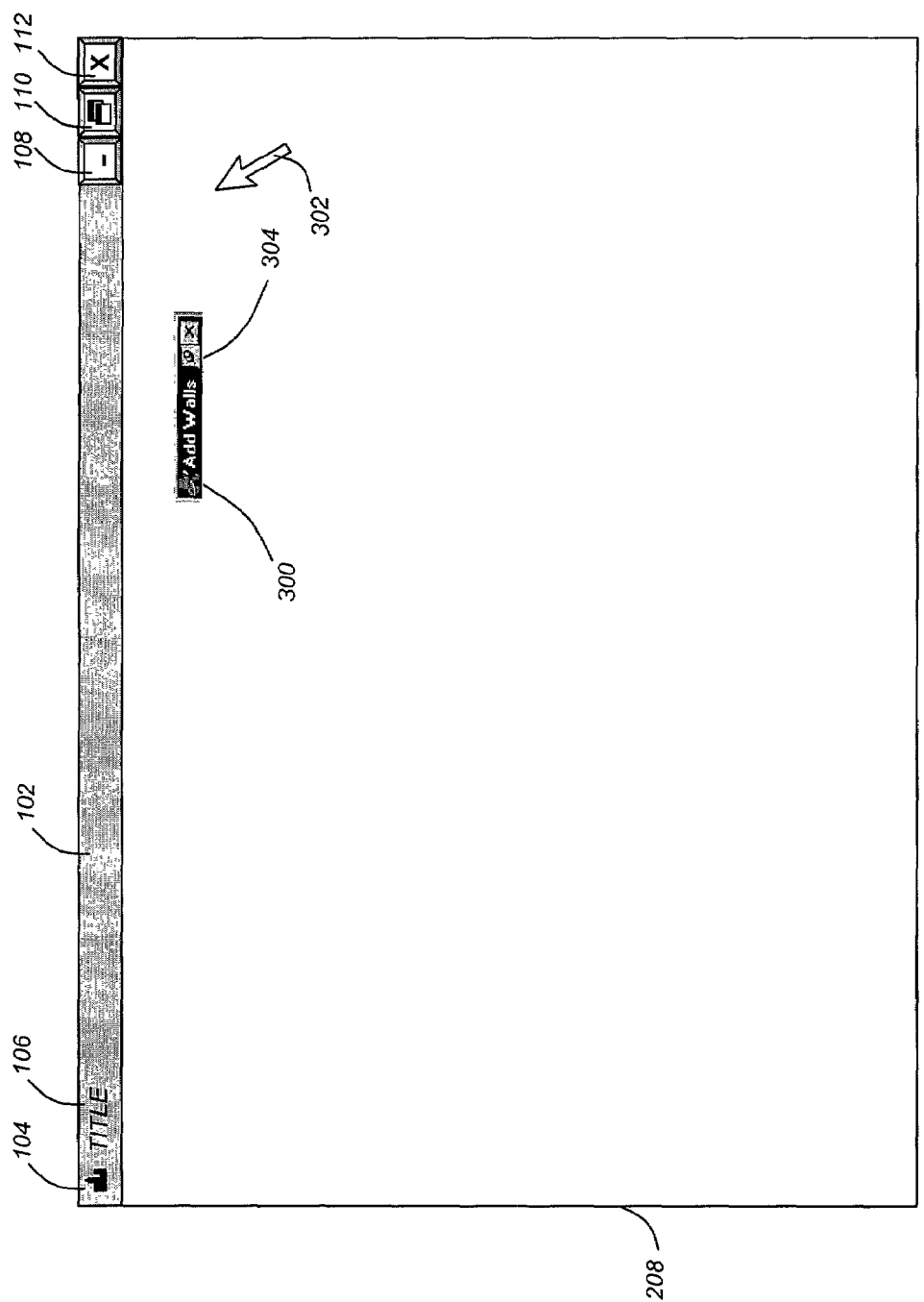
FIG. 4 illustrates a collapsed version of the dialog window of FIG. 3 in accordance with one or more embodiments of the invention.

FIG. 4 illustrates a collapsed version of dialog window 300. As illustrated in FIG. 4, cursor 302 was moved outside of complete dialog window 300 thereby resulting in dialog window 300 collapsing into a smaller area. When cursor 302 is moved back into collapsed dialog window 300, the dialog window 300 will expand once again into the complete version as illustrated in FIG. 3.

Various additional features may be available in association with the collapsible dialog window 300 as described above. For example, a small delay may occur prior to collapsing or expanding the dialog window 300 (i.e., when the cursor 302 is moved outside or back into dialog window 300). Accordingly, the cursor 302 must be moved outside of or within the dialog window 300 for a minimum time period prior to displaying a collapsed/expanded dialog window 300. Such a delay prevents rapid collapsing/expanding of the dialog window 300 occurring when the input cursor 302 hovers near the edge of dialog window 300 or when the user accidentally moves the cursor outside or inside of dialog window 300.

Another feature provides that focus reverts to the main application window 208 or another window when the collapsed version of the dialog window 300 is displayed. Thus, whenever the dialog window 300 collapses, the focus of the application reverts to the underlying application window 208. Such a feature eliminates the requirement of additional action (e.g., clicks) by a user to continue working in the main application. Further, once focus reverts to the main application window 208, focus may either remain with such a window or may revert back to the dialog window 300 when the complete version of the dialog window is displayed once again.

The dialog window 300 may also collapse to the size of the title bar. Additionally, the collapsed version may collapse to a size required to display the system buttons and the dialog title. In other words, the dialog window 300 minimizes to a size that exactly encompasses the title and system buttons in the title bar (as displayed in FIG. 4).

Another feature of the invention provides that as the dialog window 300 collapses, the window 300 collapses such that the system buttons are in the same position in the collapsed version of the dialog window as when the complete version of the dialog window 300 is displayed. As illustrated in FIGS. 3 and 4, the dialog window 300 collapses to the top right. By collapsing in such a manner, system buttons do not move away from the cursor 302 when the dialog window 300 collapses or expands. Such a methodology allows for speedier interaction with the application 208 and dialog 300.

However, if the portion of the dialog window 300 containing the system buttons is located off-screen, window 300 may not collapse and maintain the location of the system buttons because such collapsing may cause the entire collapsed dialog window 300 to display off-screen. Accordingly, the collapsed version of the dialog window 300 may be moved to ensure that it is always visible. Thereafter, embodiments may provide for displaying the complete version of the window 300 in its original full-size location.

As described above, the use of a collapsing dialog window allows a user to continue working (e.g., drawing in a CAD environment) while maximizing the available/viewable workspace. Further, by hiding/minimizing a dialog window 300, the application 208 allows the user to focus on the primary task at hand (i.e., of the work conducted in application 208) instead of on the supplemental elements depicted in a dialog window 300.

Figure 5:
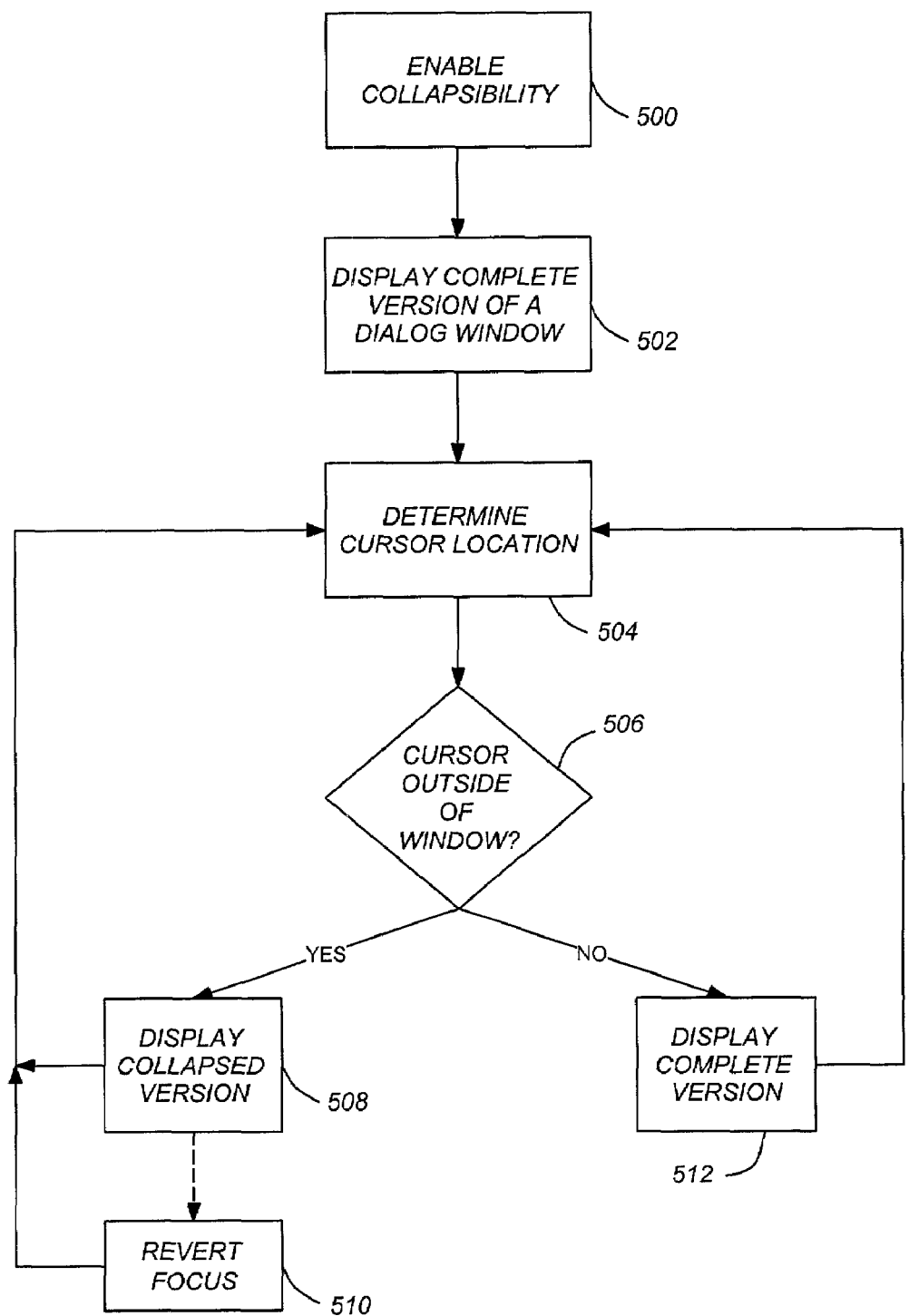
FIG. 5 is a flow chart illustrating the collapsing of a dialog window in accordance with one or more embodiments of the invention.

FIG. 5 is a flow chart illustrating the collapsing of a dialog window in accordance with one or more embodiments of the invention. The processing illustrated in FIG. 5 continues while the dialog window 300 or underlying application 208 remains open. At step 500, the collapsibility of the dialog window 300 is enabled (e.g., by depressing pushpin icon 304). At step 502, a complete version of dialog window 300 is displayed. At step 504 the location of the cursor 302 is determined.

At step 506, it is determined if the cursor 302 is outside of the dialog window 300. If the cursor 302 is outside of the dialog window 300, the collapsed version of the dialog window 300 is displayed at step 508. Such a collapsed version of the dialog window 300 consumes a smaller area of the display device than the complete dialog window 300. Further, the collapsed version may be displayed merely by the movement of the cursor outside of the dialog window without additional action by a user. Thereafter, focus may optionally revert back to the main application at step 510. However, if the cursor 302 location is within the dialog window 300, the complete version of the dialog window 300 is displayed without additional action by a user at step 512. Processing then continues at step 504 where the location of the cursor is determined once again.

CONCLUSION

This concludes the description of one or more embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for collapsing a dialog window of an application, comprising:
   displaying a complete dialog window of a currently active application on a display device;
   determining a location of a cursor with respect to the dialog window;
   displaying a collapsed version of the dialog window in response to the cursor moving from within the complete dialog window to outside of the complete dialog window without depressing a button of the dialog window, wherein the collapsed version of the dialog window consumes a smaller area of the display device than the complete dialog window and wherein the collapsed version of the dialog window comprises a title bar of the dialog window; and
   displaying the complete dialog window only in response to the cursor moving from outside of the collapsed version of the dialog window to within the title bar of the collapsed version of the dialog window without depressing a button of the dialog window.

2. The method of claim 1 wherein the collapsed version of the dialog window comprises a size that exactly encompasses a title of the dialog window and system buttons.

3. The method of claim 1 wherein the collapsed version of the dialog window is displayed in response to the cursor moving outside of the complete dialog window without additional action by a user.

4. The method of claim 1 wherein the collapsed version of the dialog window is displayed such that system buttons, within the dialog window, are in a same position, on a display device, in the collapsed version of the dialog window as when the complete dialog window is displayed, wherein the system buttons do not move away from the cursor when the dialog window collapses or expands.

5. The method of claim 1 wherein the complete dialog window is displayed when the cursor moves within the collapsed version of the dialog window without additional action by a user.

6. The method of claim 1 further comprising reverting focus to and working in another window of the currently active application without additional action by a user when the collapsed version of the dialog window is displayed.

7. The method of claim 1 wherein the collapsed version of the dialog window is displayed when the cursor moves outside of the dialog window for a defined minimum time period, wherein the minimum time period is defined in an application that displays the dialog window.

8. The method of claim 1 wherein:
   the ability to display a collapsed version of a dialog window is controlled by a selectable system icon displayed in a title bar of the dialog window;
   when the selectable system icon is selected as active, the ability, to display a collapsed version of the dialog window through further cursor movement without depressing a button of the dialog window, is active; and when the selectable system icon is not selected and is inactive, the complete dialog window is displayed and the ability, to collapse the dialog window through further cursor movement without depressing a button of the dialog window, is disabled.

9. The method of claim 1 wherein the dialog window is a modeless dialog window.

10. An article of manufacture comprising a program storage medium readable by a computer and embodying one or more instructions executable by the computer to perform a method for collapsing a dialog window of an application executing on the computer, the method comprising:

displaying a complete dialog window of a currently active application on a display device;

determining a location of a cursor with respect to the dialog window;

displaying a collapsed version of the dialog window in response to the cursor moving from within the complete dialog window to outside of the complete dialog window without depressing a button of the dialog window, wherein the collapsed version of the dialog window consumes a smaller area of the display device than the complete dialog window and wherein the collapsed version of the dialog window comprises a title bar of the dialog window; and displaying the complete dialog window only in response to the cursor moving from outside of the collapsed version of the dialog window to within the tile bar of the collapsed version of the dialog window without depressing a button of the dialog window.

11. The article of manufacture of claim 10 wherein the collapsed version of the dialog window comprises a size that exactly encompasses a tile of the dialog window and system buttons.

12. The article of manufacture of claim 10 wherein the collapsed version of the dialog window is displayed in response to the cursor moving outside of the complete dialog window without additional action by a user.

13. The article of manufacture of claim 10 wherein the collapsed version of the dialog window is displayed such that system buttons, within the dialog window, are in a same position, on a display device, in the collapsed version of the dialog window as when the complete dialog window is displayed, wherein the system buttons do not move away from the cursor when the dialog window collapses or expands.

14. The article of manufacture of claim 10 wherein the complete dialog window is displayed when the cursor moves within the collapsed version of the dialog window without additional action by a user.

15. The article of manufacture of claim 10, the method further comprising reverting focus to and working in another window of the currently active application without additional action by a user when the collapsed version of the dialog window is displayed.

16. The article of manufacture of claim 10 wherein the collapsed version of the dialog window is displayed when the cursor moves outside of the dialog window for a defined minimum time period, wherein the minimum time period is defined in an application that displays the dialog window.

17. The article of manufacture of claim 10 wherein:

the ability to display a collapsed version of a dialog window is controlled by a selectable system icon displayed in a title bar of the dialog window;

when the selectable system icon is selected as active, the ability, to display a collapsed version of the dialog window through further cursor movement without depressing a button of the dialog window, is active; and when the selectable system icon is not selected and is inactive, the complete dialog window is displayed and the ability, to collapse the dialog window through further cursor movement without depressing a button of the dialog window, is disabled.

18. The article of manufacture of claim 10 wherein the dialog window is a modeless dialog window.

19. A system for collapsing a dialog window of an application in a computer system comprising:

(a) a computer;

(b) a display device connected to the computer; and (c) a currently active application executing on the computer, the application configured to:

(i) display a complete dialog window of the currently active application on the display device;

(ii) determine a location of a cursor with respect to the dialog window;

(iii) display a collapsed version of the dialog window in response to the cursor moving from within the complete dialog window to outside of the complete dialog window without depressing a button of the dialog window, wherein the collapsed version of the dialog window consumes a smaller area of the display device than the complete dialog window and wherein the collapsed version of the dialog window comprises a title bar of the dialog window; and (iv) display the complete dialog window only in response to the cursor moving from outside of the collapsed version of the dialog window to within the title bar of the collapsed version of the dialog window without depressing a button of the dialog window.

20. The system of claim 19 wherein the collapsed version of the dialog window comprises a size that exactly encompasses a title of the dialog window and system buttons.

21. The system of claim 19 wherein the collapsed version of the dialog window is displayed in response to the cursor moving outside of the complete dialog window without additional action by a user.

22. The system of claim 19 wherein the collapsed version of the dialog window is displayed such that system buttons, within the dialog window, are in a same position, on a display device, in the collapsed version of the dialog window as when the complete dialog window is displayed, wherein the system buttons do not move away from the cursor when the dialog window collapses or expands.

23. The system of claim 19 wherein the complete dialog window is displayed when the cursor moves within the collapsed version of the dialog window without additional action by a user.

24. The system of claim 19, the application further configured to revert focus to and working in another window of the currently active application without additional action by a user when the collapsed version of the dialog window is displayed.

25. The system of claim 19 wherein the collapsed version of the dialog window is displayed when the cursor moves outside of the dialog window for a defined minimum time period, wherein the minimum time period is defined in an application that displays the dialog window.

26. The system of claim 19 wherein:

the ability to display a collapsed version of a dialog window is controlled by a selectable system icon displayed in a title bar of the dialog window;

when the selectable system icon is selected as active, the ability, to display a collapsed version of the dialog window through further cursor movement without depressing a button of the dialog window, is active; and when the selectable system icon is not selected and is inactive, the complete dialog window is displayed and the ability, to collapse the dialog window through further cursor movement without depressing a button of the dialog window, is disabled.

27. The system of claim 19 wherein the dialog window is a modeless dialog window.

* * * * *